United States Patent [19]

Moses

[11] Patent Number: 4,783,119

[45] Date of Patent: Nov. 8, 1988

[54] LIGHTWEIGHT ADJUSTABLE BICYCLE SADDLE MOUNT

[76] Inventor: Rodney D. Moses, P.O. Box 475, Selma, Oreg. 97538

[21] Appl. No.: 102,620

[22] Filed: Sep. 30, 1987

[51] Int. Cl.⁴ ............................................. B62J 1/00
[52] U.S. Cl. ..................................... 297/195; 403/84
[58] Field of Search ..................... 297/195; 403/84, 89

[56] References Cited

U.S. PATENT DOCUMENTS

| | | | |
|---|---|---|---|
| 3,891,333 | 6/1975 | Corderac'k | 287/195 |
| 3,933,391 | 1/1976 | Shook | 297/195 |
| 3,992,054 | 11/1976 | Campagnol | 297/195 |
| 4,155,590 | 5/1979 | Cunningham | 297/195 |
| 4,180,345 | 12/1979 | Routens | 403/84 |
| 4,275,922 | 6/1981 | Juy | 297/195 |
| 4,421,357 | 12/1983 | Shimano | 297/195 |
| 4,440,440 | 4/1984 | Juy | 297/195 |
| 4,502,811 | 3/1985 | Patriarca | 403/391 |
| 4,568,121 | 2/1986 | Kashima | 297/195 |

FOREIGN PATENT DOCUMENTS 2409182  7/1979  France ............................. 297/195

Primary Examiner—Francis K. Zugel

[57] ABSTRACT

The invention relates to an extremely lightweight but strong bicycle seat post that is infinitely adjustable linearly and angularly in the plane of the bicycle frame. It employs two combined fixing and adjusting bolts with the wrenching heads readily accessible on the bottom side. The linear and angular adjustments do not interact. The construction, except for the bolts, is lightweight alloy metals.

Loadbearing ability is designed to meet the needs of mountain racing and touring bicycles.

The unit can be built without recourse to unusual shapes which must be formed by casting, forging, welding or other processes requiring expensive tooling or processing; only stock pars and tubes are needed.

4 Claims, 2 Drawing Sheets

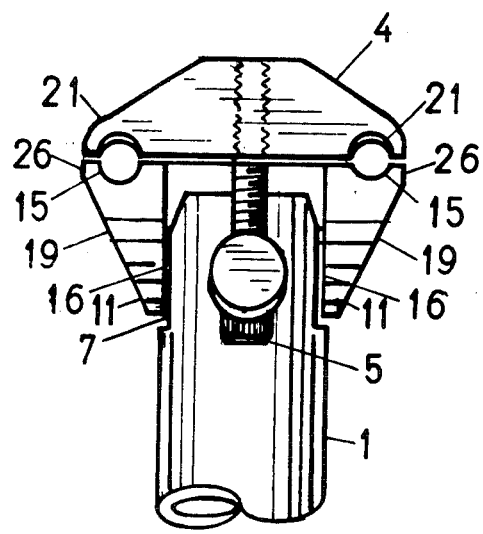
FIG 1
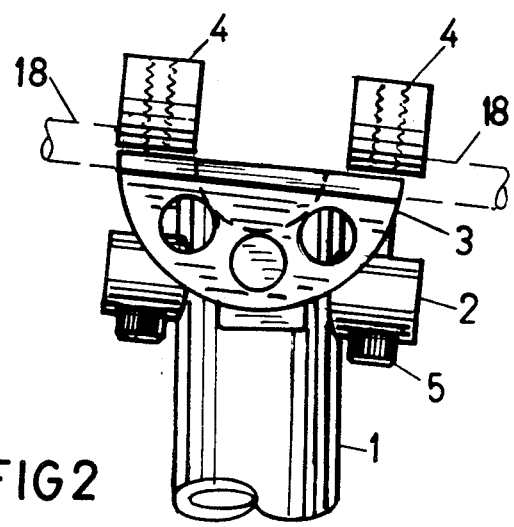
FIG 2
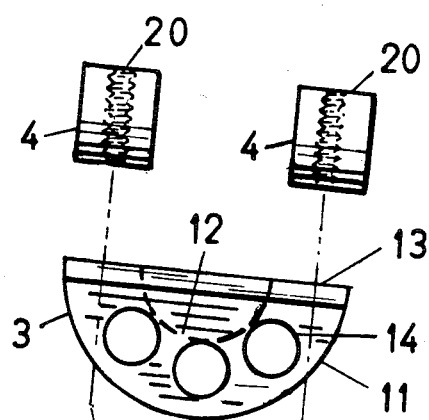
FIG 3
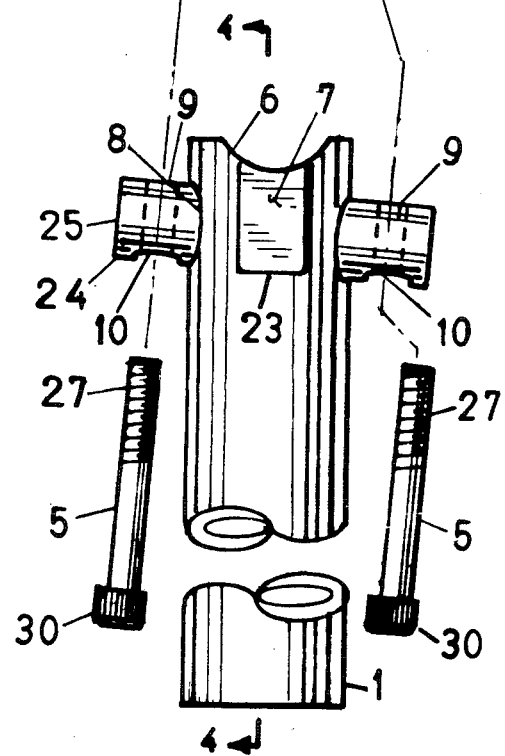

LIGHTWEIGHT ADJUSTABLE BICYCLE SADDLE MOUNT

FIELD OF INVENTION

The invention relates to an adjustable mounting between the bicycle frame and the mounting rails of a standard saddle or seat.

BACKGROUND

Attempts to design an adjustable mounting for bicycle saddles dates back to 1887, with over 33 patents to date.

Current art divided into roughly four types:

1. A horizontal pivot having toothed locking surfaces perpendicular to the saddle post and the pivot.

2. The top of the post is formed into an enlarged rearwardly projecting head usually having one or more cylindrical surfaces permiting the rotation of the saddle relative to the post by means of an intermediate member having a cylindrical surfaces conforming to the top said cylindrical surface on the head and having a means to clamp the saddle rails as a part of said intermediate member.

This embodiment is divided into three subtypes by either:

2A, Having one bolt to hold and clamp the assembly.

2B, Having two bolts, one to clamp the assembly, and one to adjust or hold the adjustment as set. The latter is commonly known as a "jack bolt".

2C, Having two bolts that act together to perform the adjustment and clamping functions. Type 2C is generally known as the "Teeter-totter" type.

Type 3: Embodiments eliminating the enlarged head and having the adjusting mechanism on the head of the post itself. They may have one clamping bolt or be two bolt teeter totter assemblies. They may have inserted end plugs or solid ends, but not offset heads.

Type 1A units are not used on high performance or expensive bicycles at this time to a great extent. One objection is the stepwise adjustment imposed by the toothed adjusting surfaces. Without said teeth, the design does not resist high loadings very well. Bird, U.S. Pat. No. 4,231,611 and Kashima, U.S. Pat. No. 4,453,765 are typical disclosures of this type. Since these designs do not accept the double rail saddle, the subject of this invention, they are not discussed.

Type 2A are common on all types of cycles. However the single locking bolt must be large and set very tight to prevent motion under shock loads, and the single bridge holding the saddle rails, unless very wide, leads to bending of the rails; also the saddle adjustment is difficult to reproduce if the unit is dis-assembled for some reason.

Campagnolo, U.S. Pat. No. 3,992,054, Cunningham, U.S. Pat. Nos. 4,155,590, Patriarca, U.S. Pat. No. 4,502,811 and Kashima, U.S. Pat. No. 4,568,121 are typical of headed, single fixing bolt embodiments. Aside from the weight of the head, some means must be provided to attach the head to the stem, or the head must be manufactured by forging, casting or upsetting; all this adds to the cost, and a joint is never as strong as the parent metal. In some designs, changing the saddle angle also affects the for and aft location, an act that may be undesirable. A single clamping bar as shown by Patriarca can lead to bending of the saddle rails under impact loading.

The "Jacking" bolts in type 2B eliminate the adjusting and slippage problems, although many operate in one direction only, thus not preventing motion the other way. Often the "jacking" and "fixing" bolts oppose and load each other requiring larger sizes at least in one bolt to carry the working load also. A typical embodiment is shown in Shimano's U.S. Pat. No. 4,421,357.

The type 3 unit is best illustrated by Shook's U.S. Pat. No. 3,933,391. A inverted form is disclosed by Routens in his U.S. Pat. No. 4,180,345. The wrenching heads of Shook's bolts are on top of the adjustor and are under the seat of the saddle, hence not easy of access. Routen's bolts carry both fixing and working loads together, hence larger bolts are required, and his head is large and heavy.

Kashima, U.S. Pat. No. 4,568,121, FIGS. 10 and 11 and Cunningham, U.S. Pat. No. 4,155,590, FIGS. 6, 7 and 8 disclose single bolt designs of Type 3. All these embodiments require an additional member attached to the end of the stem by welding or other means, and do not provide any means other than friction to preserve the adjustment, thus they require relatively heavy fixing bolts.

Juy, U.S. Pat. No. 4,440,440 discloses the use of a spherical head on the end of a bent stem. He has the same shortcommings of a all headed styles, plus a limited lateral torque resistance and a very specially shaped hole in the head to accomodate the angular adjustment.

OBJECT OF THE INVENTION

The object of this invention is to demonstrate a design for tha saddle to post adjustment for a bicycle that is very strong yet light weight, that will provide infinitely adjustable for and aft and angular adjustment but one that will resist lateral movements and loads as well a vertical load. It is one that locks securely but is easily adjustable with the heads of the adjusting screws readily accessible from below. No special shapes or forms of material that require casting, forging or upsetting are required to make the unit. No joints needing welding, pressing, riveting or adhesives are needed. The design flows the loadings through the assembly in a manner to take advantage of light weight, high strength materials at maximum efficiency. It even has consideration for the posterior of the rider if he hits a severe bump in the trail.

Lightness is acheived by eliminating unnecessary parts such as the head of all the referenced type 2A embodiments such as Campanole, Cunningham, Patriarca, Kashima and Rutens. Also plugs and endcaps such as are shown in types 2C units such as Shook, Kashima and Cunningham are eliminated.

By reversing the position of the convex adjustment surface from the intermediate member to the top of the post itself, the intermediate member can be made much lighter by flowing the working loads directly from the saddle rails into the top of the post through the surface 12: vertical loads to the convex recess in the end of the post, and lateral loads through the flanges 16 to the flats 7 on the post. By doing so, much unnecessary material can be eliminated, and in some cases even parts as in Kashima's FIG. 11, item 6a.

Another reason heavy heads can be eliminated is that a singl fixing bolt that is strong enough to prevent movement under heavy shock loads must be heavy. Serrations as in Type 1 and in Kashima's "anti slip" means of embodiment 2 are objectionable because they force stepwise adjustments. A jacking screw as in Shimano's U.S. Pat. No. 4,421,357 operates only in one direction. My invention uses two fixing bolts which, with the wide spacing between them permits the use of more petite fasteners with smaller, lighter interacting parts. The design locks the adjustment in two directions, and places the wrenching heads of the bolts on the underside where access is easy.

It is hardly possible to make a saddle mount with fewer parts than Patriarca uses. Counting the stem and the head as two parts; he has 5 pieces. However, he lacks several functions that are desirable:

1. Positive locking of the adjustment.
2. Adequate support of the saddle rails.
3. Reduction of weight in the large head.
4. Elimination of a joint between the head and stem. (or a costly part made as one piece).

By duplicating a petite bolt, a rail clamp and replacing the heavy head with my light pin 25, thus with a total of 7 pieces, I have gained all four of the above functions.

At the expense of some cost in developing tooling, I can eliminate said pin 25 by forming lugs on the sides of the tube as shown in FIG. 8 or FIG. 9, without changing the principle of my invention. At this time however, I prefer the embodiment of FIG. 1 and FIG. 2 as being producable from readily available standard materials.

Juy uses 8 pieces, yet has a heavy head, a joint and poor resistance to lateral torques as resisted by his studs, item 6.

DESCRIPTION OF DRAWINGS

FIG. 1 Is a view of the rear of the top of the post assembly.

FIG. 2 Is a view of the side of the top of the post assembly.

FIG. 3 is an exploded view of the side of the assembly.

DESCRIPTION OF THE INVENTION

Figure 4:
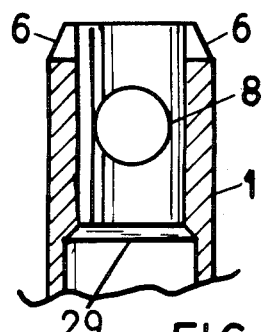
FIG. 4 is a section of the tube head where minimum weight is desired.

Please refer first to FIG. 3. 1 Is the tubular post whose diameter and length are suited to fit in the hole in the seat tube of the bicycle frame. At the top of the post is a semicylindrical recess 6 approximately centered on the end of the tube, and which ends at two parallel flats 7, one on each side of the post 1, said flats being perpendicular to the axis of said recess 6 and vertically parallel to the axis of said post 1. Just below the bottom of said recess 6 is a hole 8 through the centerline of said post 1, perpendicular to the axis of said recess 6, and inclined about 5 degrees to the vertical axis of said post 1. Into said hole 8 is lightly pressed a cross pin 25. Near the ends of crosspin 25 are two holes 9 having counterbores 10 such that the faces of said counterbores 10 are full circular areas. Said holes are on the centerline of said pin 8. Note that the lower side 24 of said pin 25 is approximately at the same level as the bottom 23 of said flat 7.

Part 3 is approximately half of a spool shaped part having a central core 12 having the same radius as that of said recess 6 in said post 1. The flanges 11 of said spool 3 have two inside flat surfaces 16, spaced apart with a slight clearance to the said parallel surfaces 7 on said post 1. The outside surfaces of said flanges 11 consist of two small flat surfaces 26, and two tapered surfaces 19 extending to the outside diameter of said semispool 3. On the top surface 13 of said semispool 3 are two semicircular slots 15 designed to accept the two support rails 18 of the saddle, which is not a part of this invention: the saddle is a readily available commercial part. 14 are three lightening holes drilled through said flange of said semispool.

Hereinafter, the semispool 3 will be refered to as the Rocker, as being a better name for it's shape and function.

Part 4 is a clamp consisting of a rectangular bar long enough to reach across to the outer flats 26 of said rocker 3. Said clamp 4 has two semicircular grooves 21 also proportioned to accept the said saddle rails 18. In the center of said clamp 4 is a female thread 20 which will accept the male threads 27 of a standard commercial high strength bolt 5. Said threads may consist off a ferrous metal insert pressed or threaded into said clamp 4.

Figure 8:
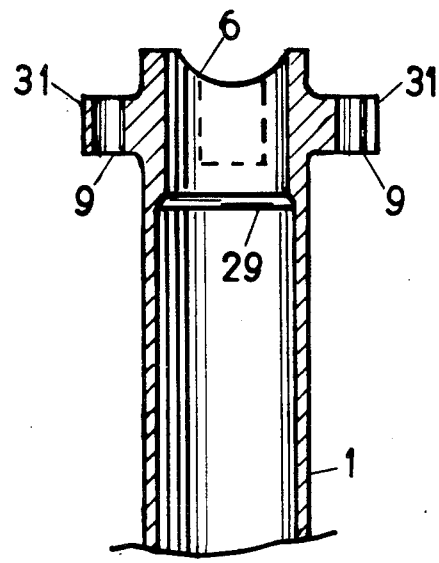
FIG. 8 is a section of the tube head showing lugs formed in the tube wall itself.

In the alternative construction of the head of post 1 shown in FIG. 8, the pin 25 is replaced by the two lugs 31 formed from the wall of the the 1 or attached thereto by a suitable means such as welding or brazing. Holes 9 in the lugs 31 are functionally the same as the holes 9 in the crosspin 25.

Figure 9:
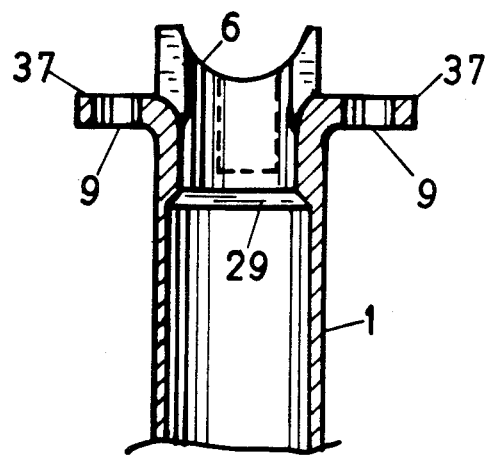
FIG. 9 is another embodiment of lugs formed from the tube.

In FIG. 9, an embodyment is shown where the lugs 37 are formed by slistting and bending down a portion of the wall of post 1. In said lug 37 are the same holes 9, functionally the same as those in crosspin 25.

OPERATION OF THE INVENTION

The rocker 3 serves as the principle load transfer means between the saddle rails 18 and the top of the post 1. The rails lie in the two grooves 15 of said rocker, and exert compression loads therto, either vertical or lateral. The vertical loads are carried through the body 12 of the rocker 3 and are transfered to said cylindrical recess 6 in the top of the said post 1, through the surface of 12.

The lateral loads are transfered from the inside flat surfaces 16 to the flat surfaces 7 on the top of said post 1.

The two bolts 5 pass through the holes 9 in the cross pin 25 and up to the clamp bars 4 where they engage the female threads in said bars 4. When the bolts are tightened, they hold the entire assembly together as is shown in FIGS. 1 and 2. Before the bolts are securely tightened, the seat rails 18 can be slid in the grooves 15/21 to obtain for and aft adjustment of the saddle. The saddle is angularly adjusted by loosening or tightening the two bolts as required. Hence these bolt serve both as fixing the adjusting bolts.

Before discussing the design in detail, please note the special characteristics of lightweight, high strength aluminum alloys such as 2024 or 6061 in the wrought, heat treated state. The compression yield strength is about 2 to 4% higher than the tensile yield strength, but the ultimate (failure) strength drops to 14–17% of the tensile yield strength if the stresses alternate between compression and tension, or even if the tensile load cycles from 0 to a value called the fatigue strength. The value of the fatigue strength varies with the number of times the load is cycled, but for a practical life, the 14 to 17% value should not be exceeded.

In the disclosed design, the vertical loads are carried in compression through the groove surfaces 14 into the body of the rocker 3 as delineated by the curved surface 12. Said surface 12 transfers the load by compression to the recess 6 in the top of the post 1. There are some bending stresses in the body of the rocker 3, but the sections are heavy and the stresses low. The lateral loads from the saddle rails 18 are carried through the inner sides of the flange surfaces 16 thence in compression to the flat faces 7 on the sides of the post 1. In the rocker 3 the fixing bolt 5 clamping loads are also compression type, carried in the same manner as the vertical operating loads.

The section in the post 1 at the holes 8 is the critical load area. Here the loads can cycle between compression and tension, and if the section is not heavy enough, the normally compression loads can go to zero or even into tensile loads. Actual field tests and trials have demonstrated that a satisfactory post can be made to handle around 200 pound riders in severe mountain races without failure, using very nominal sections of a heat treated aluminum alloy. Such amount, 14 inches long, weighs only 265 grams.

The production embodyment shown in FIGS. 8 and 9 eliminate the decreased section of the post walls caused by the hole 8, as well as the crosspin 25. However, special tooling is required and some research on the changed stress pattern in the post wall, therefore I prefer the embodiment using the pin 25 at this time, as it has been proven by field tests.

Figure 5:
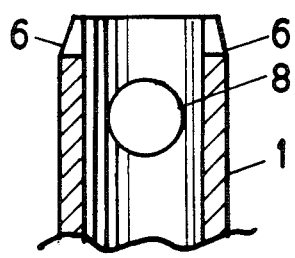
FIG. 5 is a section of the tube head where minimum cost is desired.

The holes 14 in the rocker 3 and the tapered sides 19 are weight saving measures, as well as the bored out post 1 shown in FIG. 4. When a smaller outside diameter post is required, the structure of FIG. 6 can be used with the same other components. Where cost and not weight is the prior consideration, a full length post of the proper section can be used, as shown in FIG. 5. One can also press a sleeve 28 into the end of the tube as reinforcement of this upper end as is shown in FIG. 7. In any case, the reinforcement should extend about ½ the diameter of pin 25 below the bottom of said pin 25, and should be a rounded or tapered transition 29, not a sharp corner.

The tightness of the fixing bolts does not greatly affect the basic strength of the post assembly, but like all cases where bolts are not tightened properly, any looseness will cause hammering and much more severe loadings between the loose parts. No design can overcome this problem.

In most examples of the art, the cylindrical (or sometimes spherical) surfaces wherein the angular movement occurs between the head of the post and the transisition part that holds the saddle, are arcate upward, so the convex surface is on the post member, and the concave surface is on the transition part. In my invention, I have reversed this structure, so that the concave cylindrical structure is on the top of the post. The transisition member which I call the rocker item 3, has a convex downward cylindrical surface which engages the said concave surface 6 on the top of the post. This simple change is one basis for eliminating the enlarged head on the type 2 units, since the working load can be carried from the rocker 3 to post 1 directly through the recess 6. The second basis for the elimination of the large head is the use of the small pin 25 to accept the heads 30 of the fixing bolts 5 in the counterbore 10. This move places the wrenching heads of the bolts on the bottom of the assembly where they are easily reached for adjustment. Not only does elimination of the large head lighten the assembly, it eliminates the fabrication and joining processes required.

This change also eliminates the tube plug head 53 or 6a as disclosed by Kashima in FIGS. 10 and 11. It also eliminates part 5 in FIG. 11. His bearing member 2 is inverted to my rocker 3, and can thereby be skeletinized and made much lighter.

Figure 6:
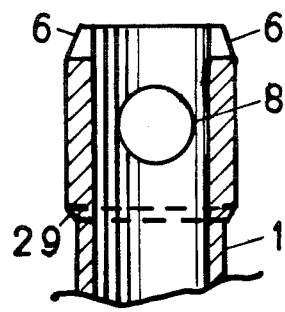
FIG. 6 is a section of the tube head where a small diameter tube outside diameter is desired.
Figure 7:
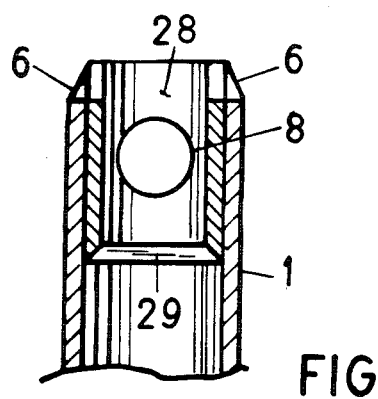
FIG. 7 is a section of the tube head where a insert sleeve is used to increase the wall thickness of the tube.

Again in Cunningham's FIGS. 6 and 7, item 103 and the process of attaching it can be eliminated and item 106 can be inverted and lightened. My pin and bolt hole design eliminates Cunningham's problem of wrench access to the bolt head at very little cost in weight: about a 50% increase in the length of a ½ inch diameter rod. My two bolt system does not suffer the variable tension he decries. His single bolt must have about twice the working area as mine, so it's weight is comparable to my two bolts.

With respect to Shook's disclosure, my invention eliminates the end plug 11, and also spaces the fixing bolts much further apart, so for a given moment or torque load produced by the saddle, the tension load in my fixing bolts are much less. I believe with the loads on his bolts and on the apex of his item 11 would require these and part 15 being made of a Ferrous metal. If so his unit suffers a weight disadvantage. His position of the bolt heads under the seat of the saddle causes a wrench access problem, and relatively sharp projections such as these heads or bolt body projections can cause discomfort to the riders's posterior.

Modern saddles consist of a moulded seat portion made of a relatively flexable plastic skin which mounts on the two saddle rails at the front and back. When the saddle is loaded, the seat portion deflects somewhat as do the 7 mm diameter seat rails. Under an extreme load as when the cycle hits a bump, the seat portion may deflect in the order of 1 to 1½ inches at the center, and the rails may also deflect substantially. As the fixing bolts or nuts are normally positioned under the center of the seat, the seat skin is driven down against the bolt area, so if they are sharp as in Shook, Shimano or CAmpagnola, injury to the rider can result.

My double clamp bars 4, tapered side to side, presented a relatively broad surface so a severe bump is ameliorated. My fixing bolts never extrend above the clampbars 4. This feature was amply and pleasantly demonstrated in mountain bicyle racing tests of my invention.

There is a critical section in my post at the centerline of the pin 25. At this tube sectional area, there are stress reversals because of lateral loads. This section must therefore be designed so the critical fatigue stress is not exceeded. About one half a pin diameter below this section, however, the tube section can be decreased at least to near the net section at the critical zone. The stress in the critical zone can also be kept within limits by pressing a sleeve 28 inside of the post 1, extending below the bottom of pin 25. This press should be quite heavy to be effective. This construction is shown in FIG. 7, where 1 is the post and 28 is the pressed in sleeve.

The cross pin 25 is set at an angle of about 85 degrees to the centerline of the post 1 and the recess 6 is slightly off-center because the nominal angle of bicycle seat tune inclines about this amount, thus a nominally level seat is 85 degrees to the post. The offset of the recess 6 is needed to clear the bolt heads 10 and to keep the clamp bars 4 on the top of rocker 3.

Again the cross pin 25 can be eliminated in production by forming the equivalent projections on each side of the post 1 to accept the bolt holes 9 without in changing the fundamental principle of my invention.

CONCLUSION

While my description contains many specific details, these should not be construed as being limitations, but as being the preferred embodiment thereof. many other variations are possible. For instance the rocker 3, instead of being made by cutting a round spool in half, can be a forging or casting thus permitting further reduction in metal volume and weight. The same is true of the bridge 4; it can be fabricated as a forging or casting.

The pin 25 through the post 1 could be replaced by two lugs containing the holes 9 and counterbore 10 for the bolts 5. The lugs might be attached by welding, brazing or even upset forged from the tube itself. They can also be sheared and bent out of the tube wall.

Accordingly the scope of the invention should be determined not by the embodiments but by the appended claims and their legal equivalents.

I claim:

1. An adjustable saddle support mount for a bicycle or similar vehicle, consisting of:
    (a) a tubular member having a semicylindrical concave recess in the top end of said tubular member, terminating in flat parallel surfaces on the surface of said tubular member perpendicular to the axis of said recess,
    (c) below and perpendicular to said recess, two lugs on opposite sides of said tube having holes therein essentially parallel to the axis of said tubular member whereby bolts can be inserted therein,
    (c) a semicircularly convex member conformably situated in said concave recess in said end of said tubular member, having semicircular flanges on both ends, straddling said flat surfaces on said tubular member, and said flanges being of substantially greater radius than said convex member,
    (d) on the top surface of each of the said flanges a semicircular convex groove spaced whereby the saddle rails can lie therein,
    (e) two clamping bars positioned above and across said tops of both of said flanges, said bars having semicircular grooves positioned conformably over said grooves in said flanges, and each having in the center, a female thread perpendicular to said grooves,
    (f) two bolts passing upwardly through said holes in said bosses and engaging said female threads in said clamping bars, whereby the parts may be fastened together in a rigid assembly.

2. An adjustable saddle mount as claimed in claim 1 wherein the said side lugs on the post consist of a crossrod inserted through holes in the sidewall of said post, perpendicular to said semicircular recess, having holes in the projecting ends thereof whereby said bolts may be inserted.

3. An article of manufacture, consisting of a tubular member having a semicircular concave recess across the end, perpendicular to the axis of the said member, said recess ending in flat areas on the outside of said tubular member, perpendicular to the axis of said recess and parallel to the axis of said tubular member,
    (a) said tubular member also having two projecting lugs somewhat below said recess, and perpendicular thereto,
    (b) said lugs having holes therein with their axes approximately parallel to the axis of said tubular member.

4. An article of manufacture as claimed in claim 3 wherein said projecting lugs are formed by a crossrod passing through holes in the sidewalls of said tubular member and projecting therefrom sufficiently to contain two holes whose axes are approximately parallel to the axis of said tubular member.

* * * * *